United States Patent
Li et al.

(10) Patent No.: US 10,891,071 B2
(45) Date of Patent: Jan. 12, 2021

(54) HARDWARE, SOFTWARE AND ALGORITHM TO PRECISELY PREDICT PERFORMANCE OF SOC WHEN A PROCESSOR AND OTHER MASTERS ACCESS SINGLE-PORT MEMORY SIMULTANEOUSLY

(71) Applicant: NXP USA, Inc., Austin, TX (US)

(72) Inventors: Yuan Li, Austin, TX (US); Eric Simard, Kanata (CA); Xiao Sun, Austin, TX (US)

(73) Assignee: NXP USA, Inc., Austin, TX (US)

( * ) Notice: Subject to any disclaimer, the term of this patent is extended or adjusted under 35 U.S.C. 154(b) by 345 days.

(21) Appl. No.: 15/980,016

(22) Filed: May 15, 2018

(65) Prior Publication Data
US 2019/0354308 A1 Nov. 21, 2019

(51) Int. Cl.
*G06F 3/06* (2006.01)

(52) U.S. Cl.
CPC .......... *G06F 3/0653* (2013.01); *G06F 3/0604* (2013.01); *G06F 3/0673* (2013.01)

(58) Field of Classification Search
CPC ..... G06F 3/0653; G06F 3/0604; G06F 3/0673
See application file for complete search history.

(56) References Cited

U.S. PATENT DOCUMENTS

| | | | |
|---|---|---|---|
| 4,899,352 A * | 2/1990 | Cucchi | G06F 5/065 375/372 |
| 6,772,254 B2 | 8/2004 | Hofmann et al. | |
| 6,874,099 B1 | 3/2005 | Balasubramanian et al. | |
| 9,483,603 B2 | 11/2016 | Zhang et al. | |
| 10,593,380 B1 * | 3/2020 | Volpe | G11C 7/22 |
| 2002/0188889 A1 * | 12/2002 | Phan | G06F 11/3409 714/38.1 |
| 2005/0273310 A1 | 12/2005 | Newburn | |

OTHER PUBLICATIONS

Brendan Gregg, Systems Performance, Enterprise and the Cloud, Prentice Hall 2014.
Misel-Myrto Papadopoulou et al., Micro-benchmarking the GT200 GPU, 2009 http://www.eecg/toronto.edu/~moshovos/CUDA08/arx/microbenchmark_report.pdf.

(Continued)

*Primary Examiner* — Eric Cardwell

(57) ABSTRACT

A method, system, program control code, and hardware circuit are provided for predicting performance of an system-on-chip (SoC) (100) having a processor (105) and a master device (106) having shared access to a single-port memory (104) by activating a timer (102) in a Performance Monitoring Unit (PMU) (101) to measure a specified number of cycles of the processor in a defined measure instance and by activating a memory access counter (103) in the PMU to measure a first count of memory access requests to the single-port memory by the processor in the defined measure instance and to measure a second count of memory access requests to the single-port memory by the master device in the defined measure instance, so that the first and second counts are stored in memory.

18 Claims, 9 Drawing Sheets

(56) References Cited

OTHER PUBLICATIONS

Bevin Brett et al., CHiP: A Profiler to Measure the Effect of Cache Contention on Scalability, 2013 IEEE 27th International Symposium on Parallel & Distributed Processing Workshops and PhD Forum, May 20-24, 2013.
Ryan Taylor et al., A Micro-benchmark Suite for AMD GPUs, 2010 IEEE 39th International Conference on Parallel Processing Workshops, Sep. 13-16, 2010.
John L. Hennessy et al., "Computer Architecture: A Quantitative Approach" (1990), Chapter 9 Input/Output, pp. 501-559.

* cited by examiner ptions exist for performing micro-bench analysis optimizations of microprocessor designs, such solutions typically use software mechanisms to collect performance data using unduly complex algorithms, and do not address the problem of conflicting accesses to single-port memories on a SoC device. Other existing solutions are directed to evaluating software performance by testing multiple elements of the application for troubleshooting in the event of failure of an application element. As seen from the foregoing, the existing SoC performance analysis solutions are extremely difficult at a practical level by virtue of the challenges with measuring and evaluating SoC performance when a processor and other masters make conflicting accesses to single-port memory, especially given the processor resources required to provide existing measurement solutions.

HARDWARE, SOFTWARE AND ALGORITHM TO PRECISELY PREDICT PERFORMANCE OF SOC WHEN A PROCESSOR AND OTHER MASTERS ACCESS SINGLE-PORT MEMORY SIMULTANEOUSLY

BACKGROUND OF THE INVENTION

Field of the Invention

The present invention is directed in general to field of integrated circuit testing and performance analysis. In one aspect, the present invention relates to a method, apparatus and system for evaluating the quantitative performance of computer systems.

Description of the Related Art

As the design complexity increases for System-On-Chip (SoC) devices, there are greater challenges with measuring SoC performance based on design specifications and simple calculations. For example, multi-core SoC designs pose a serious challenge for programmers looking to make efficient use of the hardware resources available, especially as different SoC components can limit system performance to the extent a component is the slowest part of the path between the processor and input/output (I/O) device. Another performance limitation may arise when a system component is shared or accessed by competing performance requirements. For example, certain multi-processor SoC designs will have a single-port memory that is accessed by multiple master devices, sometimes simultaneously. In these scenarios, the performance of SoC becomes difficult to estimate based on its specification and simple calculations. Specifically, a processor performance parameter (e.g., Millions of Instruction Per Second (MIPS)) can be far less than its specified value if the processor experiences delays in accessing (e.g., reading or writing) instructions or data in a memory due to conflicting accesses to the memory by competing master devices (e.g., other processors, DMA controllers, etc.) with higher priority. While existing solu-

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
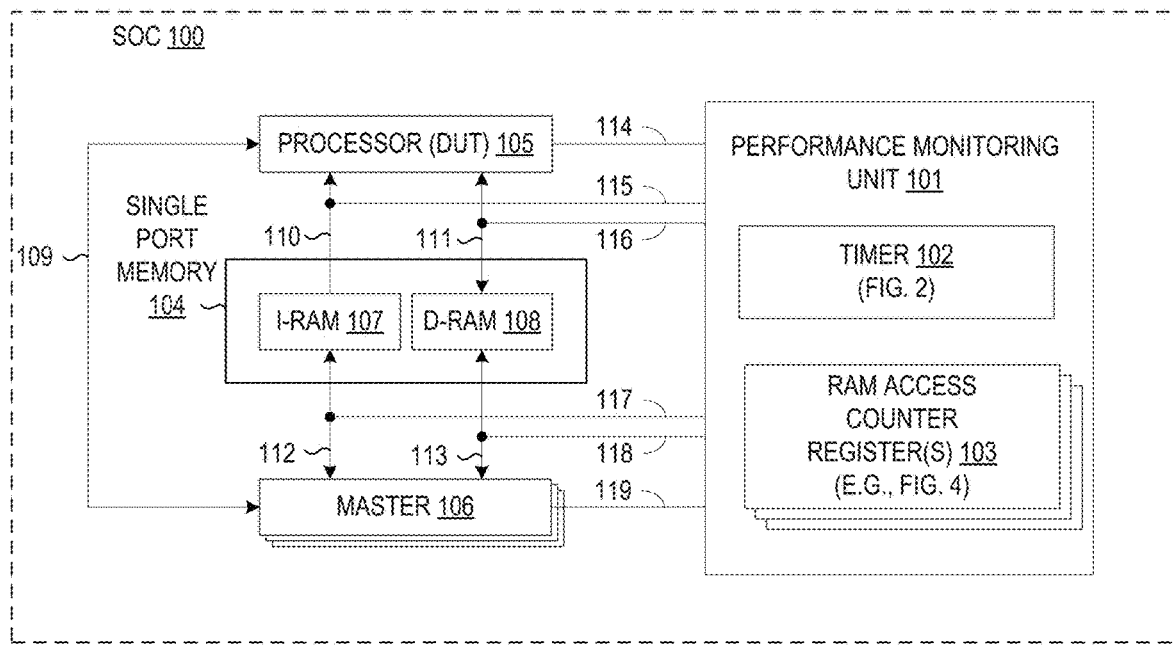
FIG. 1 is a simplified block diagram of a device under test and performance monitoring unit in accordance with selected embodiments of the present disclosure.

An apparatus, system, architecture, methodology, and program code are described for precisely predicting the performance of system-on-chip (SoC) devices with a hardware-based performance monitoring unit to collect single-port memory access counts from a processor and competing master devices. In selected embodiments, the hardware-based performance monitoring unit may be embodied in the SoC device in the form of a timer and one or more RAM access counters which track the number memory accesses from each master device to a local single-port data RAM (D-RAM) or instruction RAM (I-RAM). With the disclosed performance monitoring unit, an SoC device can track conflicting memory access operations in multi-master pipeline applications, such as where a processor accesses a single-port instruction and/or data random access memory (RAM) that is also simultaneously accessed by other processor or master devices, thereby creating performance bottlenecks when conflicting accesses occur. Examples of such conflicting accesses include, but are not limited to, an access to a local, single-port D-RAM by a processor which is processing a current frame of data (i.e., reading/writing from/to local D-RAM) at the same time when a master device (e.g., Direct-Memory-Access (DMA) engine) is transferring a next frame of data into the D-RAM and previous frame out of D-RAM. Another example of a conflicting access is when a processor is fetching instruction from local, single-port I-RAM at the same time a DMA engine is writing instructions into the I-RAM or transferring data between local I-RAM and global system RAM. In selected example embodiments, a software-based architecture, system, and methodology are provided for controlling, configuring, and managing the hardware-based performance monitoring unit to run SoC performance tests on the processor to evaluate its performance when accessing the single-port memory simultaneously with the competing master devices. For example, the software may be embodied with program code running in the processor (or a host CPU) to configure, control and readback the hardware-based performance monitoring unit, as well as manage tests and calculate performance results. In addition, the disclosed software-based architecture, system, and methodology also include algorithms to measure, analyse the SoC performance based on the measured memory access counts, thereby enabling the precise prediction of SoC performance before an algorithm is implemented in the processor, provided the percentage of memory-access of this algorithm is budgeted. For example, such algorithms may be implemented by configuring the processor (or host CPU) to calculate test parameters for different coverage and resolution, and to calculate performance measure results, as well as curves to predict performance for algorithm reference. Taken in totality, the disclosed apparatus, system, architecture, methodology, and program code provide a unified test bench that is re-usable to evaluate SoC performance in multiple platforms, e.g., simulation, emulation, and post-silicon evaluation board (EVB), etc.

To provide additional details for an improved understanding of selected embodiments of the present disclosure, reference is now made to FIG. 1 which is a simplified block diagram of System-On-Chip (SoC) device 100 which includes a processor 105 and one or more master devices 106 connected to a shared single-port memory 104 and a performance monitoring unit 101. In particular, the processor 105 is a device-under-test (DUT) that is connected to a single-port memory 104 which may be embodied as a local I-RAM 107 and/or D-RAM 108, and which may also be accessed by one or more master devices 106. In selected embodiments, the processor DUT 105 may be defined as any engine whose function is controlled by an instruction flow, and the master device(s) 106 may be defined as a single or multiple engines (e.g., processor, hardware accessor, DMA, interface, etc.) that have data transfer capability to and/or from the single-port memory 104. As will be appreciated, the clock rate of the processor DUT 105 is not necessarily synchronous with the clock(s) for the master device(s) 106.

As depicted, the processor DUT 105 includes one or more direct connections 110, 111 to configure, control, and start/stop the single-port memory 104, such as the I-RAM/D-RAM 107, 108. Similarly, the master device(s) 106 may include one or more direct connections 112, 113 to configure, control, and start/stop the single-port memory 104, 107, 108. In addition, the processor DUT 105 includes one or more direct connections 109 to read the status of the master device 106, though the processor DUT 105 may be indirectly connected through a host CPU (not shown) to control the master device(s) 106. The processor DUT 105, master device(s) 106, and single-port memory 104 are each connected to a hardware-based Performance Monitoring Unit (PMU) 101 which tracks the number memory accesses to the single-port memory 104 by each processor DUT 105 and master device 106. To this end, the PMU 101 includes a timer 102 and one or more RAM access counter registers 103, such as an I-RAM access counter or D-RAM access counter described hereinbelow. In operation of the PMU 101, the timer 102 is provided to generate each measure instance in terms of the number of cycles of the processor DUT 105 during which memory accesses are counted by the RAM access counter registers 103. In the context of the present disclosure a memory "access" includes reading and/or writing to the single-port memory 104. To monitor such accesses, the PMU 101 is connected across probes 114-119. To monitor access requests from the processor DUT 105, the PMU 101 is connected over a first probe 114 to the processor DUT 105, and is also connected over read/write probes 115, 116 to the processor's read/write signals to I-RAM 107 and D-RAM (108), respectively. In similar fashion, the PMU 101 is connected over a second probe 119 to each master device 106, and is connected over probes 117, 118 to the read and write signals from master device 106 to the I-RAM 107 and D-RAM 108, respectively.

Figure 2:
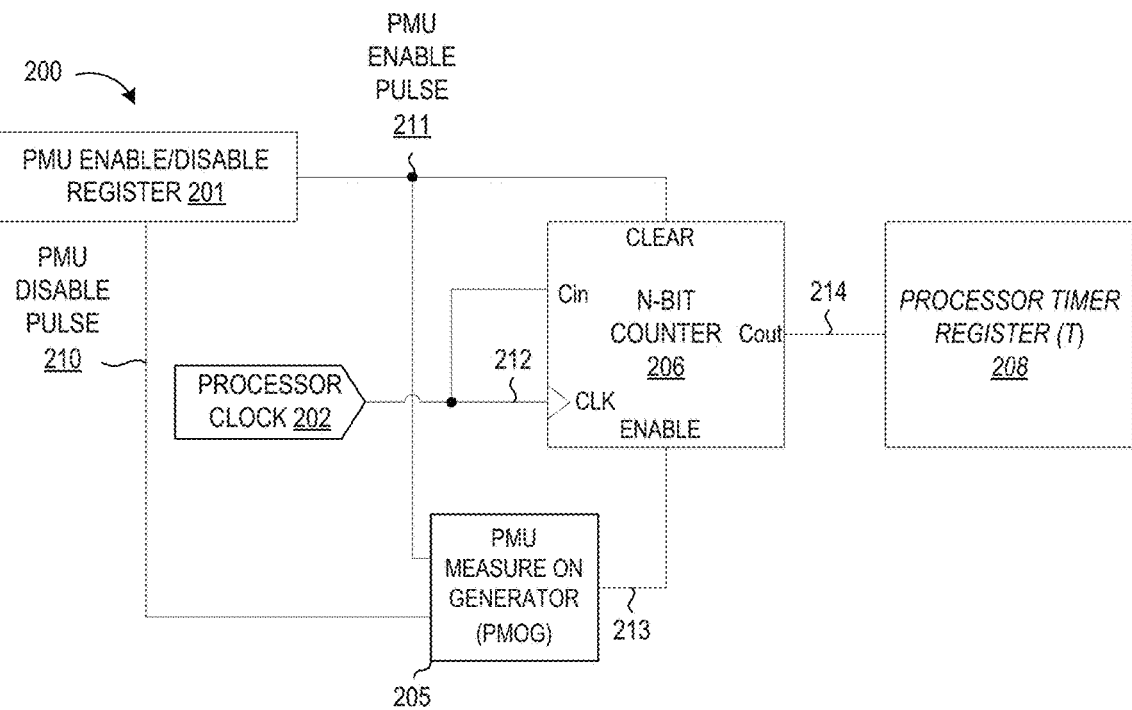
FIG. 2 is a simplified schematic block diagram of a timer in the performance monitoring unit in accordance with selected embodiments of the present disclosure.

To provide additional details for an improved understanding of selected embodiments of the present disclosure, reference is now made to FIG. 2 which is a simplified schematic block diagram of a timer 200, such as used in the performance monitoring unit 101 of FIG. 1. As depicted, the timer 200 includes an n-bit counter 206 and processor timer register 208 which are connected to measure the number of cycles of the processor DUT in each measure instance in response to inputs provided by an enable/disable register 201, processor clock 202, and control logic 205 for generating a "PMU Measure On" signal (PMOG). In the n-bit counter 206, the number of bits, N, should be enough to contain the duration of longest test instance. In addition the enable/disable register 201 should be programmable by the processor DUT to generate "PMU disable pulse" 210 and "PMU enable pulse" 211 signals as one-cycle pulse signals. With the "PMU enable pulse" signal 211 connected as an input to the "CLEAR" pin of the n-bit counter 206, the processor timer register 208 may be reset. The PMU enable pulse 211 is also input with the "PMU disable pulse" signal 210 at the PMOG control block 205 to generate the "PMU Measure On" signal 213 that is connected as an input to the "ENABLE" pin of the n-bit counter 206, thereby enabling the n-bit counter 206 to count each input processor clock pulse 212 which is input as the counter input Cin and clock input CLK for the n-bit counter 206, and to store the results 214 in the processor timer register 208 between the times when the "PMU enable pulse" signal 211 and "PMU disable pulse" signal 210 are reset.

Figure 3:
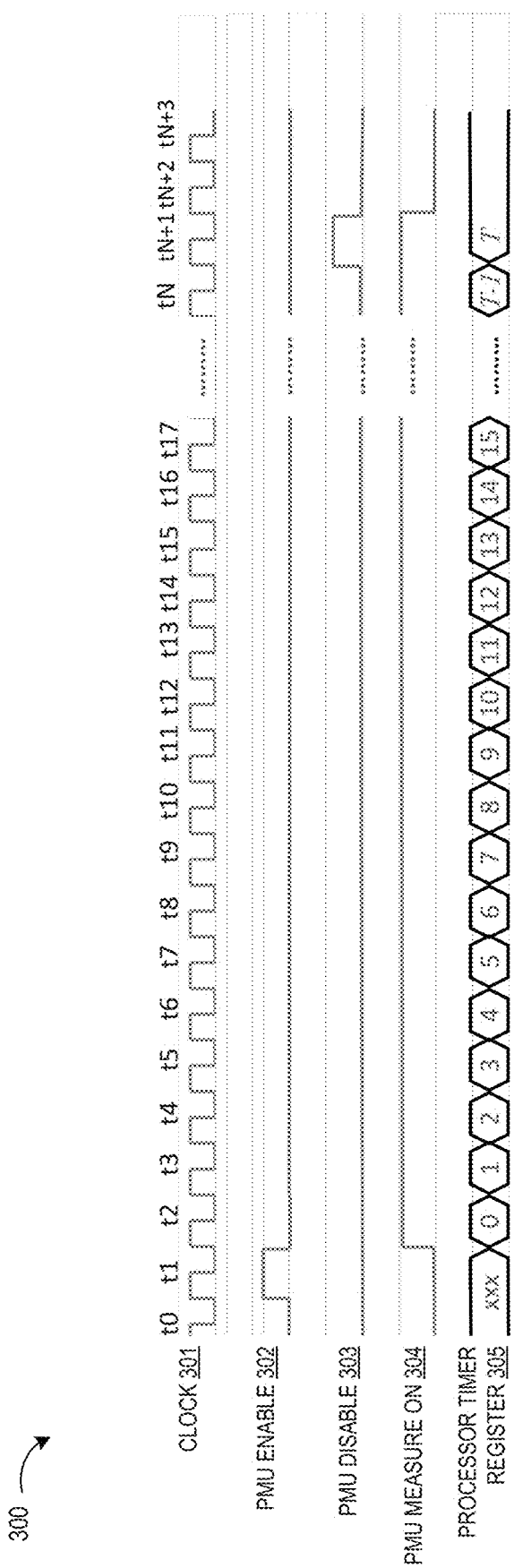
FIG. 3 depicts a first timing diagram of selected signals in the timer shown in FIG. 2.

To illustrate the operation of the timer 200, reference is now made to FIG. 3 which depicts a timing diagram 300 of selected signals 301-305. As depicted, the processor input clock signal 301 provides a plurality of processor clock pulses (e.g., t0, t1, . . . tN+3) to the counter input Cin and clock input CLK of the n-bit counter 206. Once the "PMU enable" pulse signal 302 (e.g., from the enable/disable register 201) is reset (e.g., at processor clock pulse t2), the "PMU Measure ON" signal 304 is set and provided as an "ENABLE" input signal to the n-bit counter 206 which then counts each incoming pulses (e.g., t2-tN+1) from the processor clock input 301 for output and storage in the processor timer register 305. The processor clock pulses 301 continue to be counted and stored until such time as the "PMU disable" pulse signal 303 (e.g., from the enable/disable register 201) is reset (e.g., at processor clock pulse tN+2), thereby resetting the "PMU Measure ON" signal 304 and disabling the clock input counting operations. At this point, the processor timer register stores the value T for the number of processor clock pulses 301 counted while the "PMU Measure ON" signal 304 was set.

Figure 4:
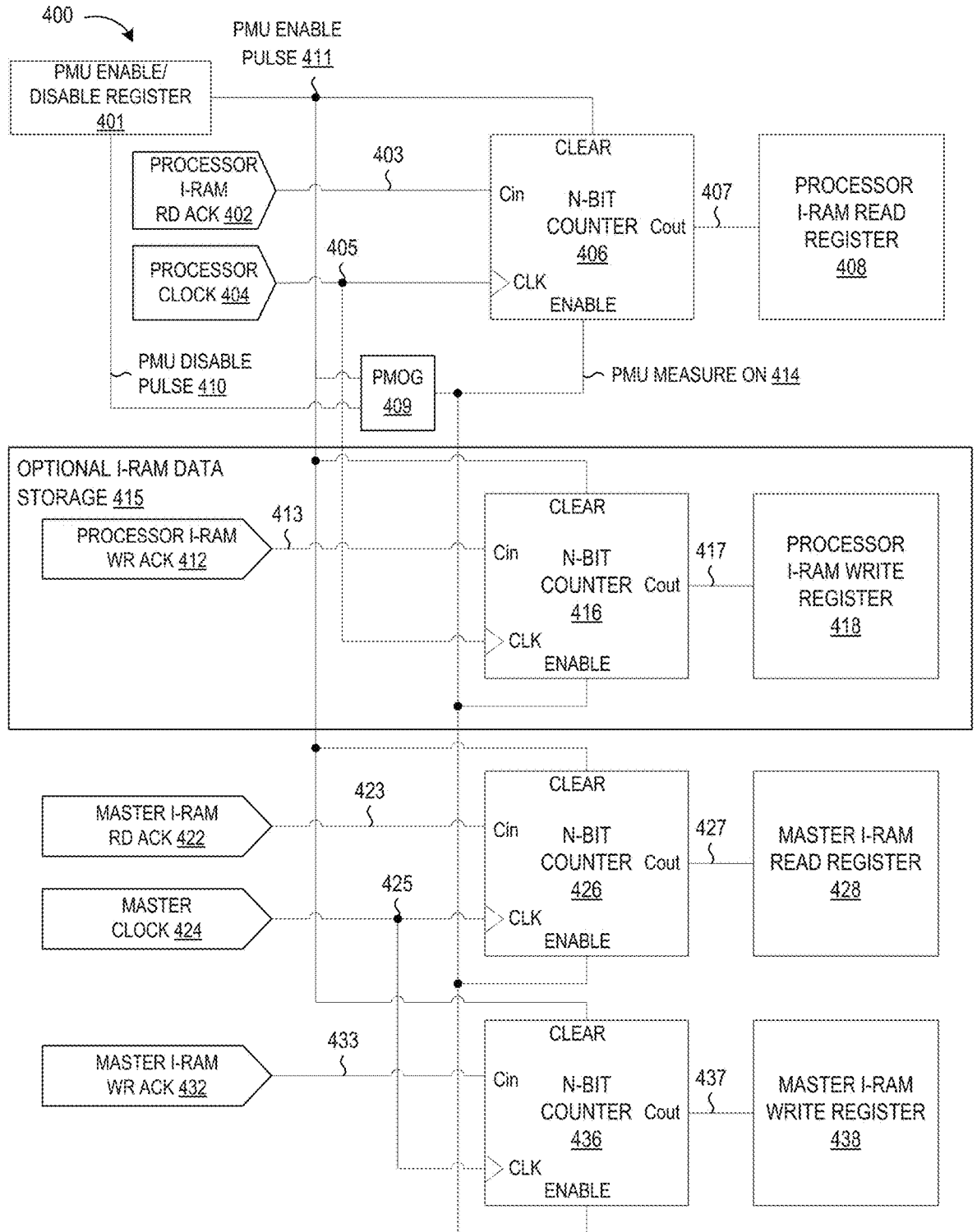
FIG. 4 is a simplified schematic block diagram of an I-RAM access counter in the performance monitoring unit in accordance with selected embodiments of the present disclosure.

To provide additional details for an improved understanding of selected embodiments of the present disclosure, reference is now made to FIG. 4 which is a simplified schematic block diagram of an I-RAM access counter 400, such as used in the RAM access counter register 103 of the performance monitoring unit 101 of FIG. 1. As depicted, the I-RAM access counter 400 includes a plurality of n-bit counters 406, 416, 426, 436 connected to measure different access requests to an I-RAM (e.g., 107 in FIG. 1) from different master devices (e.g., processor 105 and master 106). In particular and as described hereinbelow, the n-bit counter 406 is connected to count the number of read requests made by the processor to the single-port I-RAM, the n-bit counter 416 is connected to count the number of write requests made by the processor to the single-port I-RAM, the n-bit counter 426 is connected to count the number of read requests made by the master to the single-port I-RAM, and the n-bit counter 436 is connected to count the number of write requests made by the master to the single-port I-RAM. As indicated with the optional I-RAM data storage block 415, the n-bit counter 416 may optionally be included when the I-RAM is configured to not only provide read access to the processor for instructions being retrieved from the I-RAM, but also provides write access to the processor for storing data in the I-RAM, such as arises in a special condition the I-RAM is re-assigned to store data instead of instructions.

To track the respective I-RAM memory access counts, each counter has its input signal, Cin, connected, respectively, to a "Processor I-RAM Read ACK" 402, "Processor I-RAM Write ACK" 412, "Master I-RAM Read ACK" 422, and "Master I-RAM Write ACK" 432 over signal input lines 403, 413, 423, 433, respectively. In turn, each n-bit counter 406, 416, 426, 436 has its output signal, Cout, connected, respectively, to a "Processor I-RAM Read Register" 408, "Processor I-RAM Write Register" 418, "Master I-RAM Read Register" 428, and "Master I-RAM Write Register" 438 over signal output lines 407, 417, 427, 437, respectively. Thus connected, the n-bit counters 406, 416 for tracking I-RAM memory accesses by the processor are connected to receive the processor clock signal 404 as clock inputs CLK over clock signal input line 405, while the n-bit counters 426, 436 for tracking I-RAM memory accesses by the master are connected to receive the master clock signal 424 as clock inputs CLK over clock signal input line 425. In this way, the processor and master devices may operate at different clock rates.

To control the timing of when the n-bit counters 406, 416, 426, 436 are enabled for memory access count operations, the enable/disable register 401 is configured to generate a "PMU enable pulse" signal 411 that is connected as an input to the "CLEAR" pin of the n-bit counters 406, 416, 426, 436, thereby clearing the counter output signal Cout. In addition, the PMU enable pulse 411 is input with the "PMU disable pulse" signal 410 to the PMOG control block 409 to generate the "PMU Measure On" signal 414 that is connected as an input to the "ENABLE" pin of the n-bit counters 406, 416, 426, 436, thereby enabling each counter 406, 416, 426, 436 to count the respective memory access counts input as counter input values Cin. The counting operations at each n-bit counter 406, 416, 426, 436 are clocked at their respective clock inputs CLK and stored in output storage registers 408, 418, 428, 438, respectively, until such time as the "PMU disable pulse" signal 410 causes the PMOG control block 409 to reset the "PMU Measure On" signal 414, thereby disabling counter operations. With this timing control arrangement, the n-bit counters 406, 416, 426, 436 are cleared with a single "CLEAR" signal from the "PMU enable pulse" signal 411 so as to be reset to zero at the falling edge of the "PMU enable pulse" signal 411. In addition, each separately clocked n-bit counter 406, 416, 426, 436 may be enabled with a single "ENABLE" signal from the PMOG control block 409 so that each counter 406, 416, 426, 436 increases its count by one at the falling edge of each received ACK signal 403, 413, 423, 433, and stops counting at the falling edge of the "PMU Measure On" signal.

Figure 5:
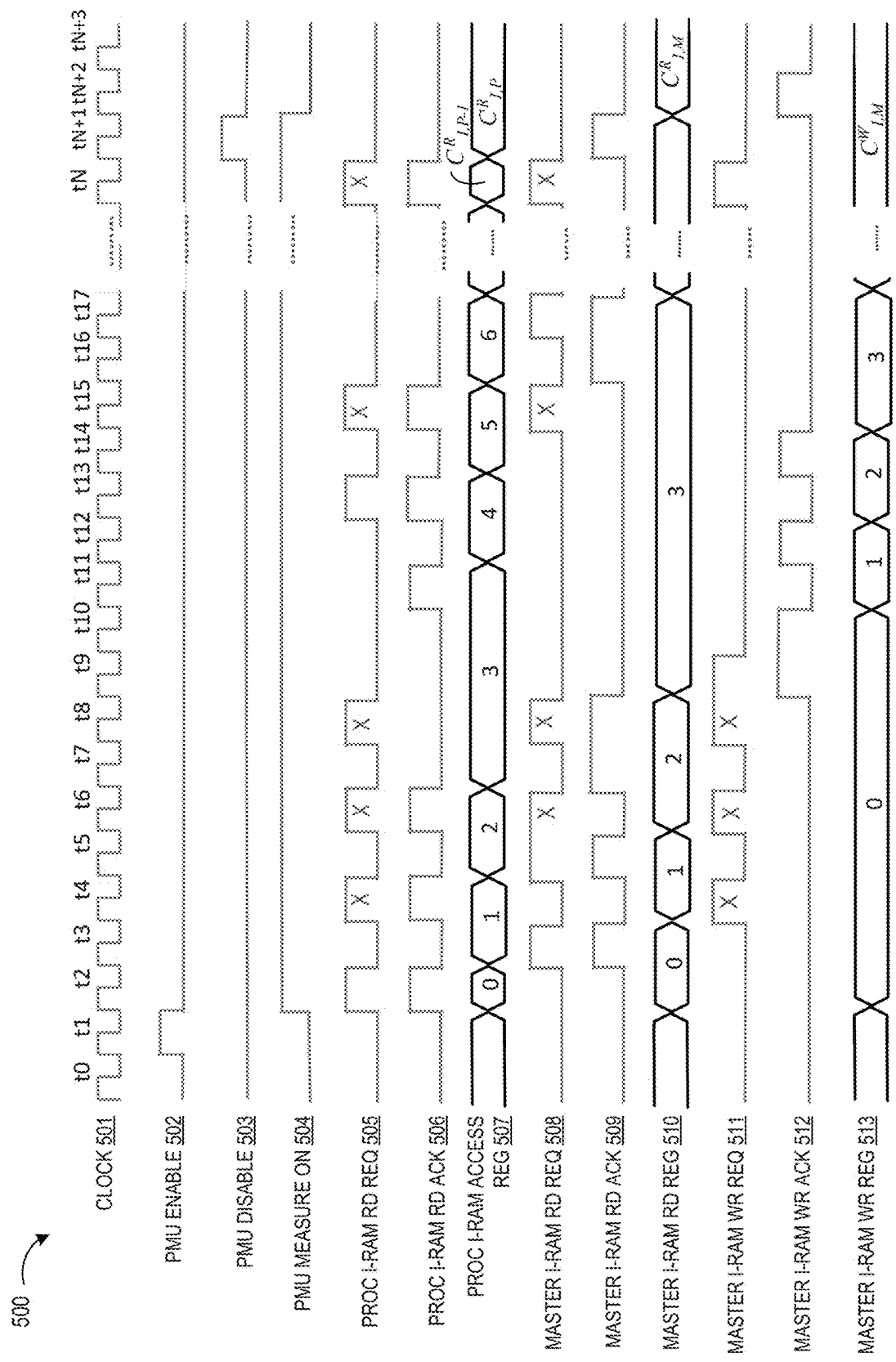
FIG. 5 depicts a second timing diagram of selected signals in the I-RAM access counter shown in FIG. 4.

To illustrate the operation of the I-RAM access counter 400, reference is now made to FIG. 5 which depicts a timing diagram 500 of selected signals 501-513 from the I-RAM counter in which the optional I-RAM data storage block 415 is not included. As depicted, the clock signal 501 may be generated by the processor clock 401 or master clock 424 as a plurality of processor clock pulses (e.g., t0, t1, . . . tN+3). In the depicted example embodiments of the I-RAM access counter, for easy of description, the input clock 501 provided as a processor input clock to the clock input CLK of the n-bit counters 406, is also provided as a master input clock to the clock input CLK of the n-bit counters 426, 436. Alternatively, the processor and master clocks may be separately generated. Once the "PMU enable" pulse signal 502 (e.g., from the enable/disable register 401) is reset (e.g., at processor clock pulse t2), the "PMU Measure ON" signal 504 is set and provided as an "ENABLE" input signal to the n-bit counters 406, 426, 436 which then each count incoming read and write access acknowledgements (e.g., RD ACK, WR ACK) from the single-port I-RAM issued in response to memory access requests by the processor and master. In particular, the n-bit counter 406 is clocked by the processor clock 501 to count each I-RAM read acknowledgement 506 issued by the I-RAM to the processor in response to the processor I-RAM read request 505 for output and storage in the processor I-RAM access register 507. In similar fashion, the n-bit counter 426 is clocked by input clock 501 to count each I-RAM read acknowledgement 509 issued by the I-RAM to the master in response to the master I-RAM read request 508 for output and storage in the master I-RAM read register 510. Finally, the n-bit counter 436 is clocked by input clock 501 to count each I-RAM write acknowledgement 512 issued by the I-RAM to the master in response to the master I-RAM write request 511 for output and storage in the master I-RAM write access register 513. The read and write access acknowledgements 506, 509, 512 continue to be counted and stored until such time as the "PMU disable" pulse signal 503 (e.g., from the enable/disable register 401) is reset (e.g., at processor clock pulse tN+2), thereby resetting the "PMU Measure ON" signal 504 and disabling the memory access counting operations. At this point, processor I-RAM read register 408, master I-RAM read register 428, and master I-RAM write register 438 store the respective memory access count values counted while the "PMU Measure ON" signal 504 was set.

As indicated with the "X" labels, there can be conflicting memory access requests to the single-port I-RAM memory when the timing of read requests to the I-RAM by the processor 505 conflicts with read requests to the I-RAM by the master 508 and/or write requests to the I-RAM by the master 511. As a result, the values stored in the processor I-RAM access register 507 reflect the number of I-RAM read requests from the processor that are serviced after any conflicting accesses are resolved, with the final stored value $C_{I,P}^{R}$ representing the final count (C) for the processor (P)'s read operation (R) to the I-RAM (I). In similar fashion, the values stored in the master I-RAM read register 510 reflect the number of I-RAM read requests from the master that are serviced after any conflicting accesses are resolved, with the final stored value $C_{I,M}^{R}$ representing the final count (C) for the master (M)'s read operation (R) to the I-RAM (I). Finally, the values stored in the master I-RAM write register 513 reflect the number of I-RAM write requests from the master that are serviced after any conflicting accesses are resolved, with the final stored value $C_{I,M}^W$ representing the final count (C) for the master (M)'s write operation (W) to the I-RAM (I). As shown in the I-RAM access register values 507, 510, 513 of the timing diagram 500, the memory access count in each register is incremented only after any conflicts with simultaneous I-RAM access requests are resolved.

Figure 6:
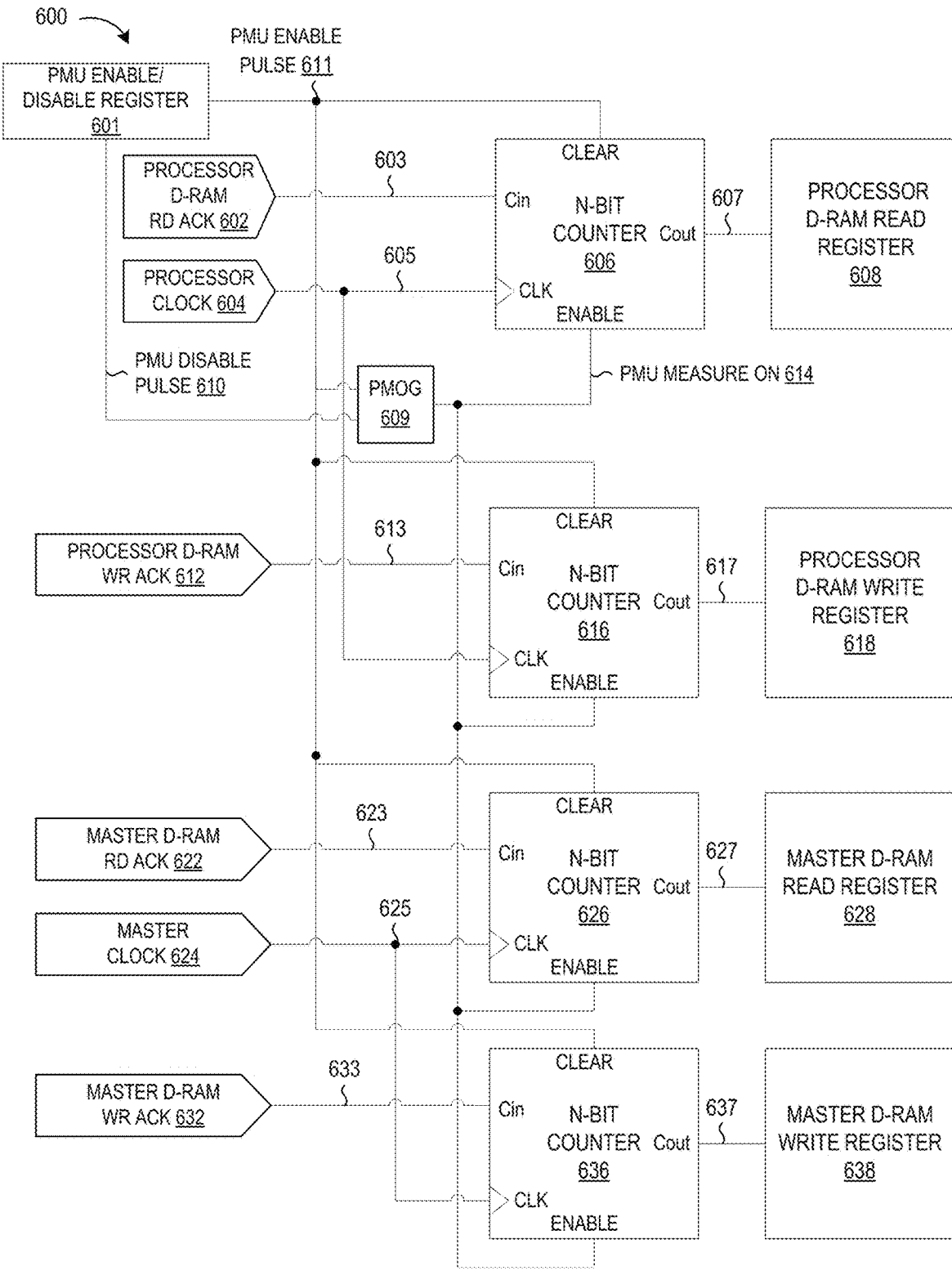
FIG. 6 is a simplified schematic block diagram of a D-RAM access counter in the performance monitoring unit in accordance with selected embodiments of the present disclosure.

To provide additional details for an improved understanding of selected embodiments of the present disclosure, reference is now made to FIG. 6 which is a simplified schematic block diagram of a D-RAM access counter 600, such as used in the RAM access counter register 103 of the performance monitoring unit 101 of FIG. 1. As depicted, the D-RAM access counter 600 includes a plurality of n-bit counters 606, 616, 626, 636 connected to measure different access requests to a D-RAM (e.g., 108 in FIG. 1) from different master devices (e.g., processor 105 and master 106). In particular and as described hereinbelow, the n-bit counter 606 is connected to count the number of read requests made by the processor to the single-port D-RAM, the n-bit counter 616 is connected to count the number of write requests made by the processor to the single-port D-RAM, the n-bit counter 626 is connected to count the number of read requests made by the master to the single-port D-RAM, and the n-bit counter 636 is connected to count the number of write requests made by the master to the single-port D-RAM.

To track the respective D-RAM memory access counts, each counter 606, 616, 626, 636 has its input signal, Cin, connected, respectively, to a "Processor D-RAM Read ACK" 602, "Processor D-RAM Write ACK" 612, "Master D-RAM Read ACK" 622, and "Master D-RAM Write ACK" 632 over signal input lines 603, 613, 623, 633, respectively. In turn, each n-bit counter 606, 616, 626, 636 has its output signal, Cout, connected, respectively, to a "Processor D-RAM Read Register" 608, "Processor D-RAM Write Register" 618, "Master D-RAM Read Register" 628, and "Master D-RAM Write Register" 638 over signal output lines 607, 617, 627, 637, respectively. Thus connected, the n-bit counters 606, 616 for tracking D-RAM memory accesses by the processor are connected to receive the processor clock signal 604 as clock inputs CLK over clock signal input line 605, while the n-bit counters 626, 636 for tracking D-RAM memory accesses by the master are connected to receive the master clock signal 624 as clock inputs CLK over clock signal input line 625. In this way, the processor and master devices may operate at different clock rates.

To control the timing of when the n-bit counters 606, 616, 626, 636 are enabled for memory access count operations, the enable/disable register 601 is configured to generate a "PMU enable pulse" signal 611 that is connected as an input to the "CLEAR" pin of the n-bit counters 606, 616, 626, 636, thereby clearing the counter output signal Cout. In addition, the PMU enable pulse 611 is input with the "PMU disable pulse" signal 610 to the PMOG control block 609 to generate the "PMU Measure On" signal 614 that is connected as an input to the "ENABLE" pin of the n-bit counters 606, 616, 626, 636, thereby enabling each counter 606, 616, 626, 636 to count the respective memory access counts input as counter input values Cin. The counting operations at each n-bit counter 606, 616, 626, 636 are clocked at their respective clock inputs CLK and stored in output storage registers 608, 618, 628, 638, respectively, until such time as the "PMU disable pulse" signal 610 causes the PMOG control block 609 to reset the "PMU Measure On" signal 614, thereby disabling counter operations. With this timing control arrangement, the n-bit counters 606, 616, 626, 636 are cleared with a single "CLEAR" signal from the "PMU enable pulse" signal 611 so as to be reset to zero at the falling edge of the "PMU enable pulse" signal 611. In addition, each separately clocked n-bit counter 606, 616, 626, 636 may be enabled with a single "ENABLE" signal from the PMOG control block 609 so that each counter 606, 616, 626, 636 increases its count by one at the falling edge of each received ACK signal 603, 613, 623, 633, and stops counting at the falling edge of the "PMU Measure On" signal 614.

Figure 7:
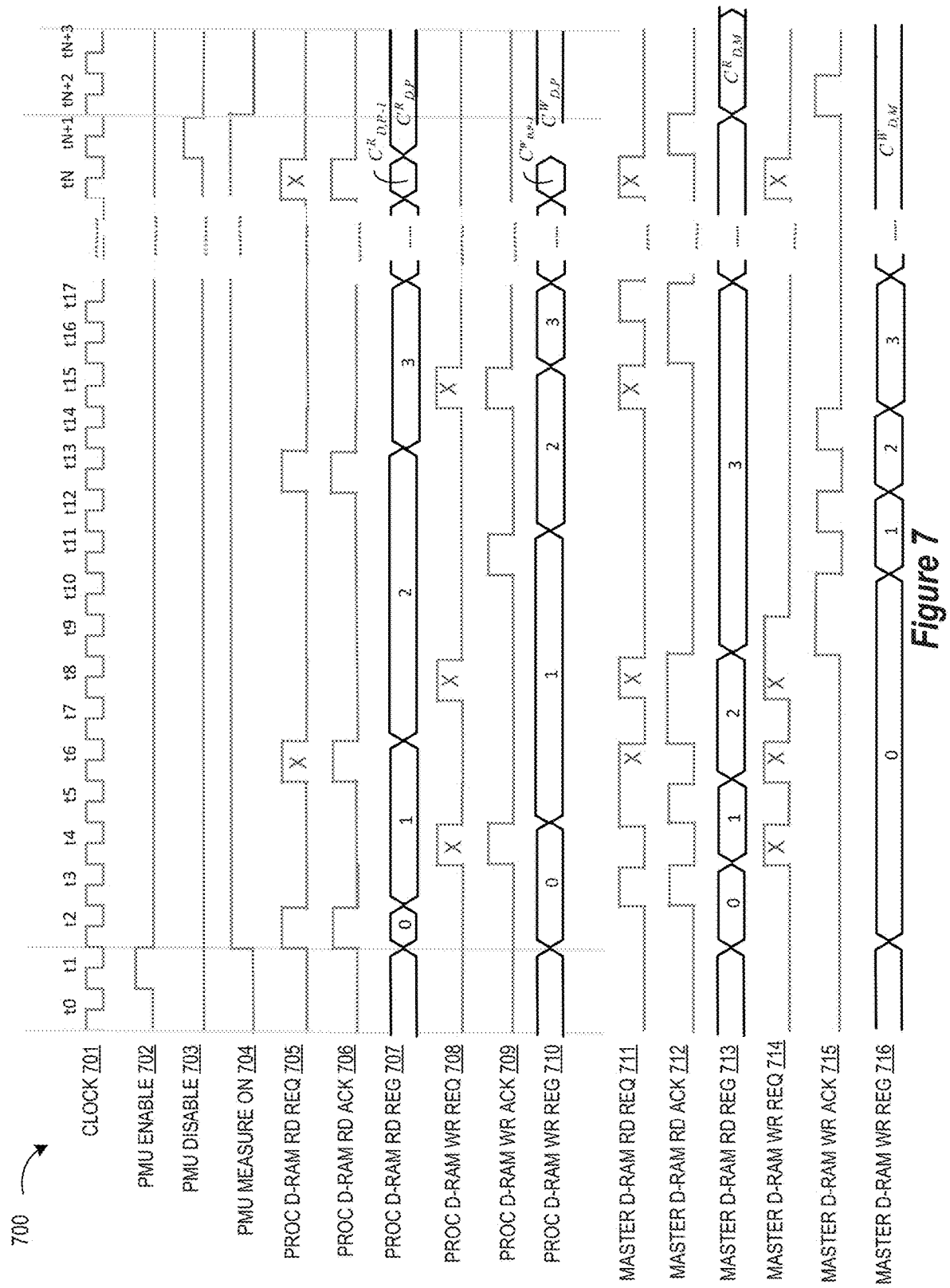
FIG. 7 depicts a third timing diagram of selected signals in the D-RAM access counter shown in FIG. 6.

To illustrate the operation of the D-RAM access counter 600, reference is now made to FIG. 7 which depicts a timing diagram 700 of selected signals 701-716 from the D-RAM counter. As depicted, the clock signal 701 may be generated by the processor clock 601 or master clock 624 as a plurality of processor clock pulses (e.g., t0, t1, . . . tN+3). In the depicted example embodiments of the D-RAM access counter, for easy of description, the input clock 701, provided as a processor input clock to the clock input CLK of the n-bit counters 606, 616, is also provided as a master input clock to the clock input CLK of the n-bit counters 626, 636. Alternatively, the processor and master clocks may be separately generated. Once the "PMU enable" pulse signal 702 (e.g., from the enable/disable register 601) is reset (e.g., at processor clock pulse t2), the "PMU Measure ON" signal 704 is set and provided as an "ENABLE" input signal to the n-bit counters 606, 616, 626, 636 which then each count incoming read and write access acknowledgements (e.g., RD ACK, WR ACK) from the single-port D-RAM issued in response to memory access requests by the processor and master. In particular, the n-bit counter 606 is clocked by the processor clock 601 to count each D-RAM read acknowledgement 706 issued by the D-RAM in response to the processor D-RAM read request 705 for output and storage in the processor D-RAM read access register 707. Likewise, the n-bit counter 616 is clocked by input clock 701 to count each D-RAM write acknowledgement 709 issued by the D-RAM in response to the processor D-RAM write request 708 for output and storage in the processor D-RAM write access register 710. In similar fashion, the n-bit counter 626 is clocked by input clock 701 to count each D-RAM read acknowledgement 712 issued by the D-RAM in response to the master D-RAM read request 711 for output and storage in the master D-RAM read register 713. Finally, the n-bit counter 736 is clocked by input clock 701 to count each D-RAM write acknowledgement 715 issued by the D-RAM in response to the master D-RAM write request 714 for output and storage in the master D-RAM write access register 716. The read and write access acknowledgements 706, 709, 712, 715 continue to be counted and stored until such time as the "PMU disable" pulse signal 703 (e.g., from the enable/disable register 601) is reset (e.g., at processor clock pulse tN+2), thereby resetting the "PMU Measure ON" signal 704 and disabling the memory access counting operations. At this point, processor D-RAM read register 608, processor D-RAM write register 618, master D-RAM read register 628, and master D-RAM write register 638 store the respective memory access count values counted while the "PMU Measure ON" signal 704 was set.

As indicated with the "X" labels, there can be conflicting memory access requests to the single-port D-RAM memory when the timing of read requests to the D-RAM by the processor 705 conflicts with write requests to the D-RAM by the processor 708, read requests to the D-RAM by the master 711 and/or write requests to the D-RAM by the master 714. As a result, the values stored in the processor D-RAM access register 707 reflect the number of D-RAM read requests from the processor that are serviced after any conflicting accesses are resolved, with the final stored value $C_{D,P}{}^R$ representing the final count (C) for the processor (P)'s read operation (R) to the D-RAM (D). In addition, the values stored in the processor D-RAM write register 710 reflect the number of D-RAM write requests from the processor that are serviced after any conflicting accesses are resolved, with the final stored value $C_{D,P}{}^W$ representing the final count (C) for the processor (P)'s write operation (W) to the D-RAM (D). In similar fashion, the values stored in the master D-RAM read register 713 reflect the number of D-RAM read requests from the master that are serviced after any conflicting accesses are resolved, with the final stored value $C_{D,M}{}^R$ representing the final count (C) for the master (M)'s read operation (R) to the D-RAM (D). Finally, the values stored in the master D-RAM write register 716 reflect the number of D-RAM write requests from the master that are serviced after any conflicting accesses are resolved, with the final stored value $C_{D,M}{}^W$ representing the final count (C) for the master (M)'s write operation (W) to the D-RAM (D). As shown in the D-RAM access register values 707, 710, 713, 716 of the timing diagram 700, the memory access count in each register is incremented only after any conflicts with simultaneous D-RAM access requests are resolved.

Figure 8:
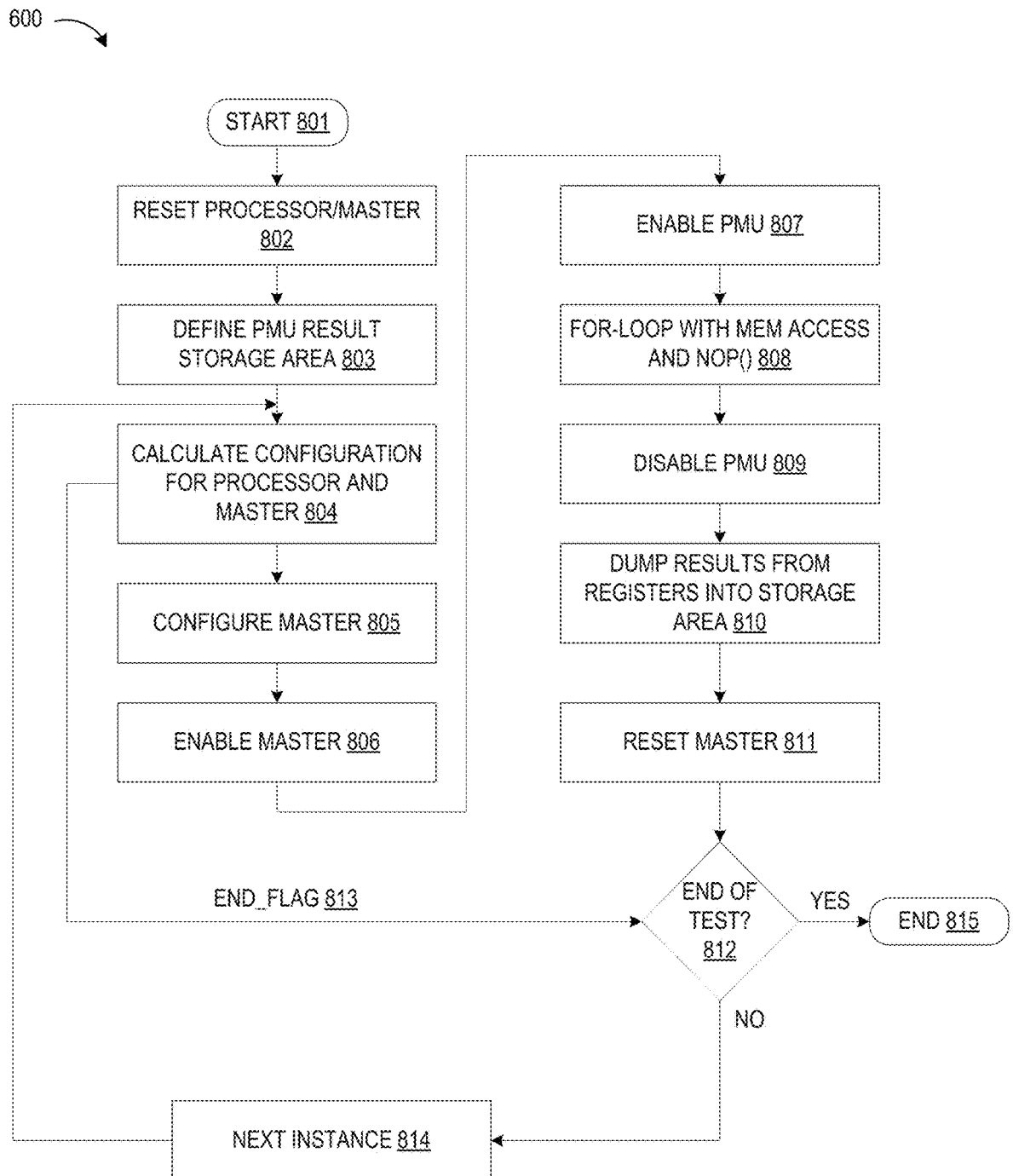
FIG. 8 illustrates a simplified flow chart sequence for predicting performance of a System-on-Chip in which a processor and master(s) simultaneously access a single-port memory in accordance with selected embodiments of the present disclosure.

To provide additional details for an improved understanding of selected embodiments of the present disclosure, reference is now made to FIG. 8 which depicts a simplified flow chart sequence for predicting performance of a system-on-chip (SoC) device in which a processor and master(s) simultaneously access a single-port memory in accordance selected embodiments of the present disclosure. In the depicted example embodiments, the control logic and methodology shown in FIG. 8 may be implemented in whole or in part on a SoC device with a combination of hardware and software that is executed on one or more host computing systems, processors, or microcontroller units that includes processor and memory for storing programming control code.

Thus implemented, the specified sequence of operations are performed to track conflicting memory access operations in multi-master pipeline applications with performance monitoring hardware under control of software program code running in the processor or host CPU to configure, control and readback the performance monitoring hardware, as well as manage tests and calculate performance results using algorithms which calculate test parameters for different coverage and resolution and which calculate performance measure results.

In FIG. 8, the method starts at step 801, at which point the SoC device initially resets the processor DUT along with other SoC masters at step 802. In the reset operation, the n-bit counters and output access registers may have their values cleared, such as by issuing the PMU enable pulse.

At step 803, a PMU result storage area is defined in memory for storing the configuration parameters and the resulting PMU results, such as the memory access count information captured with the output access registers. As will be appreciated, the memory storage area may be in system RAM of the SoC device, or may be "off-chip" from the SoC device. In normal cases where there are multiple test instances within one test case, the storage area defined at step 803 will reserve certain areas in memory to store PMU results from the output access registers into memory after an instance is done, thereby allowing the output access registers to be flushed by results of next instance. After a test is done, the PMU results of all instances may be dumped out from the defined storage area for post-processing.

At step 804, initial configuration parameters are calculated for the processor DUT and any competing master(s) on the SoC device by translating the requirements for a test case into configuration data, including configuration parameters for macro-loop and micro-loop calculations described more fully hereinbelow with reference to FIG. 9. While any suitable approach for calculating configuration data may be used, consider the example of a test case to measure throughput of a processor to access a single-port D-RAM when accessed simultaneously by a competing master on the SoC device, where the target of a test is to generate a MIPS performance curves. In this example, inputs to the test case would include (1) the throughput of the master (e.g., x Mega-Byte-per-Second), and (2) a percentage range of D-RAM accesses by the processor in total MIPS (e.g., range from 0% to 100%). Given these inputs, the calculation performed at step 804 will generate a plurality of configuration parameters, including the number of instances of this test. For example, in order to cover the range from 0% to 100%, then the calculation of N=11 instances are determined: 0%, 10%, 20%, . . . , 90%, 100%. In addition, the calculation at step 804 may generate a configuration parameter within each instance with a specified percentage of D-RAM accesses by the processor by examining multiple patterns of memory read, memory write and non-memory-access operations in order to cover all possibilities. An additional configuration parameter calculated at step 804 may include one or more master configuration parameters to generate the specified master throughput (e.g., x Mega-Byte-per-Second), including the burst size, bit-width, frequency to read or write D-RAM, etc. The parameter calculation step 804 also determines the number of N instances processed by the loop so that a final loop count value 813 (e.g., END_FLAG) may be provided to the step 812 for detecting the end of testing. As will be appreciated, the configuration parameters can change for different instances.

Next, a sequence of steps is performed in a loop for each of N instances. In each loop, each master is configured at step 805, such as by using selected configuration parameters calculated at step 804. As will be appreciated, the configuration of the masters at step 805 may specify the data transfer configurations to the throughput of master to access I-RAM and D-RAM and some special control signals. Once configured, the master is then enabled at step 806, such as by writing a "DMA ENABLE" register (in the case of a master that is a DMA engine), by starting a loop of data read/write, opening an interface, etc. The next step in the loop sequence is to enable the Performance Management Unit (PMU) at step 807, such as by setting up the PMU Enable Register (e.g., 401) to generate the PMU enable pulse (e.g., 411) to start the n-bit counters (e.g., 406, 416, 426, 436) in the PMU. At step 808, the next step in the loop sequence runs a "for-loop" operation with various combinations of memory access and nop( ) values, where a "memory access" value indicates a processor instruction which performs a memory access, and a "nop( )" value indicates a processor instruction which does not perform a memory access. As described more fully herein below with reference to FIG. 9, the processing at step 808 may include multiple memory read operations, multiple memory write operations, and multiple single-cycle non-memory-access operations (a.k.a., nop( )) operations). After each "for-loop" is finished, the PMU is disabled at step 809, such as by setting up the PMU Enable Register (e.g., 401) to generate the PMU disable pulse (e.g., 410) to disable the n-bit counters (e.g., 406, 416, 426, 436) in the PMU. Once the PMU is disabled, the memory access count results can be collected at step 810, such as by dumping the values from the output access registers into the defined storage area. The loop sequence for an instance then ends by resetting the master at step 811, thereby terminating the master's access to memory, clearing its configurations, resetting registers, and initializing state machines, etc., in order to prepare for next test instance.

At step 812, the method checks if the end of the test has been reached, such as by detecting if the last instance has been processed. If not (negative outcome to detection step 812), then the next instance is selected (step 814), and steps 804-811 are repeated. However, if the end of the test is reached (affirmative outcome to detection step 812), then the method ends (step 815).

Figure 9:
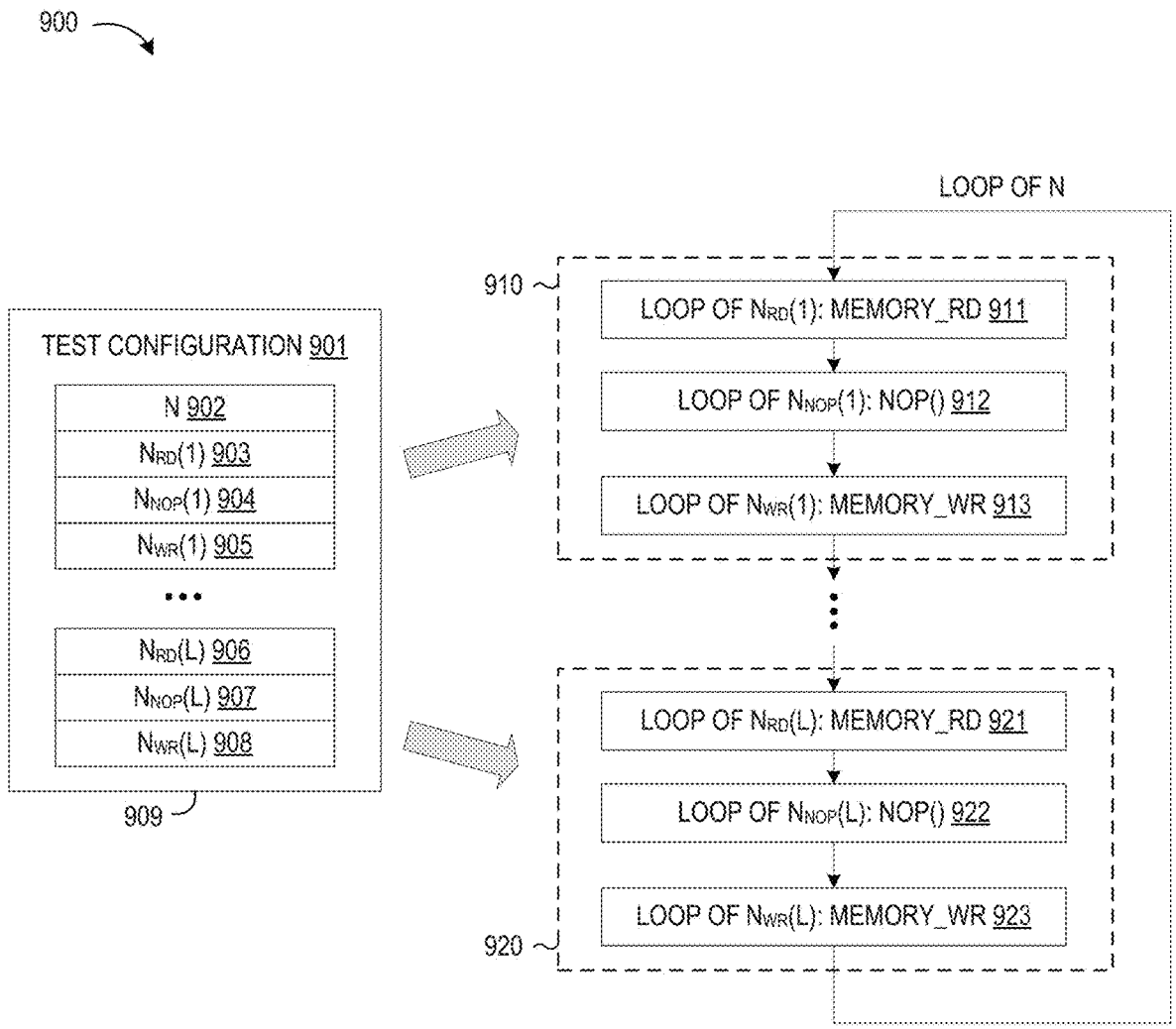
FIG. 9 illustrates a detailed flow of a for-loop process step in the sequence of FIG. 8 for simulating different memory read/write operations and non-memory-access related operations by a processor in accordance with selected embodiments of the present disclosure.

To provide additional details for an improved understanding of selected embodiments of the present disclosure, reference is now made to FIG. 9 which illustrates a detailed flow of the for-loop process step 808 in sequence of FIG. 8 for simulating different memory read/write operations and non-memory-access related operations by a processor. In general terms, the processing shown in FIG. 9 illustrates a program control code algorithmic functionality for determining test configuration data, processing the test configuration data to calculate performance results, and then analysing the SoC performance by evaluating the performance results. In particular, test configuration data 901 includes a plurality of test parameters 902-908 that are calculated and stored in memory 909. In selected embodiments, the configuration test parameters 901 include a first parameter N 902 which specifies the number of macro-loops (N), and is equivalent to the number of N test instances calculated at step 804. The configuration test parameters 901 also include a second parameter L which specifies the number of micro-loops (L), where each set of processing instructions (e.g., memory read, single-cycle non-memory-access(nop( )), memory write) is one micro-loop so that there are L micro-loop runs in one test instance. In addition, the configuration test parameters 901 include a third set of parameters 903, 906 $N_{rd}(1), N_{rd}(2), \ldots N_{rd}(L)$ (which specify the number of memory read operations ($N_{rd}$) in each of L micro-loops), a fourth set of parameters 904, 907 $N_{NOP}(1), N_{NOP}(2), \ldots N_{NOP}(L)$ (which specify the number of nop( ) operations ($N_{NOP}$) in each of L micro-loops), and a fifth set of parameters 905, 908 $N_{WR}(1), N_{WR}(2), \ldots N_{WR}(L)$ (which specify the number of memory write operations ($N_{WR}$) in each of L micro-loops).

To provide an illustrative example, the test configuration parameters 902-908 may be determined by initially defining setup parameters, including a first setup parameter L (specifying the number of micro-Loops), a second setup parameter A (specifying normalization factor as a positive integer), a third setup parameter $R_{wr}$ (specifying a percentage of single-port memory write operations by the processor), and a fourth setup parameter $R_{rd}$ (specifying a percentage of single-port memory read operations by the processor). In this setup, the combined percentages of single-port memory access operations ($R_{wr}+R_{rd}$) is the percentage of single-port memory access of the processor in total MIPS.

Using the setup parameters L, A, $R_{wr}$, $R_{rd}$, a plurality of fixed or independent random sequences are used to generate vectors having a fixed length L. For example, the processing generates a first vector $R=R(1), R(2), \ldots, R(L)$ in range of [0, 1]; a second vector $O=O(1), O(2), \ldots, O(L)$ in range of [0, 1], and a third vector $W=W(1), W(2), \ldots, W(L)$ in range of [0, 1]. Next, the process applies a normalization process to the vectors R, O, W to generate normalized vectors, $N_{rd}$, $N_{nop}$, $N_{wt}$. For example, the normalization process calculates a first normalized vector $N_{rd}=\text{int}(R_{rd}AR)$ by computing a first plurality of values, $N_{rd}(1)=\text{int}(R_{rd} \times A \times R(1)), N_{rd}(2)=\text{int}(R_{rd} \times A \times R(2)), \ldots, N_{rd}(L)=\text{int}(R_{rd} \times A \times R(L))$, where int( ) indicates the conversion from floating point number into integer by rounding. In addition, the the normalization process calculates a second normalized vector $N_{nop}=\text{int}((1-R_{rd}-R_{wt})AO)$ by computing a second plurality of values, $N_{nop}(1)=\text{int}((1-R_{rd}-R_{wr}) \times A \times O(L)), N_{nop}(2)=\text{int}((1-R_{rd}-R_{wr}) \times A \times O(2)), \ldots, N_{nop}(L)=\text{int}((1-R_{rd}-R_{wr}) \times A \times O(L))$. Finally, the the normalization process calculates a third normalized vector $N_{wr}=\text{int}(R_{wr}AW)$ by computing a third plurality of values, $N_{wr}(1)=\text{int}(R_{wr} \times A \times W(1)), N_{wr}(2)=\text{int}(R_{wr} \times A \times W(2)), \ldots, N_{wr}(L)=\text{int}(R_{wr} \times A \times W(L))$. Upon computing the normalized vectors $N_{rd}, N_{nop}, N_{wr}$, the vector values are stored as test configuration data 901 in the order of $\{N_{rd}(1), N_{nop}(1), N_{wr}(1), \ldots, N_{rd}(L), N_{nop}(L), N_{wr}(L)\}$ in memory 909.

To provide an example, consider the scenario where the setup parameters L, A, $R_{wr}$, $R_{rd}$ are defined to specify L=10 micro-loops, 50% of RAM access of processor in total MIPS with $R_{wr}=R_{rd}=25\%$, and A=1000. With these setup parameters, the fixed sequence vectors R, O, W with length 10 are generated as follows: R (1, 2, ..., 10)=(1, 1, ..., 1), O (1, 2, ..., 10)={1, 1, ..., 1}, and W(1, 2, ..., 10)={1, 1, ..., 1}. After normalization, the normalized vectors $N_{rd}$, $N_{nop}$, $N_{wt}$ are generated as follows:

$$N_{rd}(1)=250, N_{rd}(2)=250, \ldots, N_{rd}(10)=250$$

$$N_{nop}(1)=500, N_{nop}(2)=500, \ldots, N_{nop}(10)=500$$

$$N_{wr}(1)=250, N_{wr}(2)=250, \ldots, N_{wr}(10)=250.$$

The values from the normalized vectors are then reordered and stored into buffers in the memory 909 in the following sequence of test configuration data 903-908: {250, 500, 250, 250, 500, 250, ..., 250, 500, 250}.

When processing the test configuration data 901, the program control code algorithmic functionality implements N macro-loops, where each macro-loop includes L micro-loops 910, 920. In i-th micro-loop (e.g., micro-loop 910), there is a sequence of three operations, i.e., $N_{rd}(i)$ times of memory reading 911, $N_{nop}(i)$ times of nop( ) 912, and $N_{wr}(i)$ times of memory writing 913.

Once the N macro-loops of processing are completed, the measured results are processed using a program control code functionality to calculate the performance results for the processor under test. In an example algorithm, a clock rate $f_P$ is defined as the clock rate of the processor in units of MHz. In addition, the following measured results are retrieved:

T: number of processor cycles in one test instance, as illustrated in FIG. 3;

$C^R_{I,P}$: number of times the processor reads from I-RAM, as illustrated in FIG. 5;

$C^W_{I,P}$: number of times the processor writes into I-RAM (optional);

$C^R_{I,M}$: number of times the master reads from I-RAM, as illustrated in FIG. 5;

$C^W_{I,M}$: number of times the master writes into I-RAM, as illustrated in FIG. 5;

$C^R_{D,P}$: number of times the processor reads from D-RAM, as illustrated in FIG. 7;

$C^W_{D,P}$: number of times the processor writes into D-RAM, as illustrated in FIG. 7;

$C^R_{D,M}$: number of times the master reads from D-RAM, as illustrated in FIG. 7; and $C^W_{D,M}$: number of times the master writes into D-RAM, as illustrated in FIG. 7.

With this information, the program control code functionality calculates performance results by first calculating the MIPS of the processor as $$MIPS = \alpha \frac{c^R_{I,P}}{T} f_P,$$

where $\alpha$ is a constant indicating average number of instructions per I-RAM word, specified by the Processor. In addition, the throughput of the processor operations for reading from D-RAM is calculated as $$\gamma^R_{D,P} = \beta_D \frac{c^R_{D,P}}{T} f_P$$

in units of MByte/sec, where $\beta_D$ is a constant indicating number of bytes in one D-RAM word. In addition, the throughput of the processor operations for writing into D-RAM is calculated as $$\gamma^W_{D,P} = \beta_D \frac{c^W_{D,P}}{T} f_P$$

in units of Mbyte/sec. As a result, the total throughput of the processor in accessing D-RAM may be calculated as $$\gamma_{D,P} = \beta_D \frac{c^R_{D,P} + c^W_{D,P}}{T} f_P$$

in units of Mbyte/sec.

In similar fashion, the program control code functionality calculates performance results for the master by calculating throughput of the master operations for reading from I-RAM as $$\gamma^R_{I,M} = \beta_I \frac{c^R_{I,M}}{T} f_P$$

in units of MByte/sec, where $\beta_I$ is a constant indicating number of bytes in one I-RAM word. In addition, the throughput of the master operations for writing into I-RAM is calculated as $$\gamma^W_{I,M} = \beta_I \frac{c^W_{I,M}}{T} f_P$$

in units of Mbyte/sec. As a result, the total throughput of the master in accessing I-RAM may be calculated as $$\gamma_{I,M} = \beta_I \frac{c^R_{I,M} + c^W_{I,M}}{T} f_P$$

in units of Mbyte/sec.

The program control code functionality may also calculate the throughput of the master operations in reading from D-RAM as $$\gamma^R_{D,M} = \beta_D \frac{c^R_{D,M}}{T} f_P$$

in unit of MByte/sec, where $\beta_D$ is a constant indicating number of bytes in one D-RAM word. Likewise, the throughput of the master operations in writing into D-RAM is calculated a $$\gamma^W_{D,M} = \beta_D \frac{c^W_{D,M}}{T} f_P$$

in units of Mbyte/sec. As a result, the total throughput of the master in accessing D-RAM may be calculated as $$\gamma_{D,M} = \beta_D \frac{c^R_{D,M} + c^W_{D,M}}{T} f_P$$

in units of Mbyte/sec.

Figure 10:
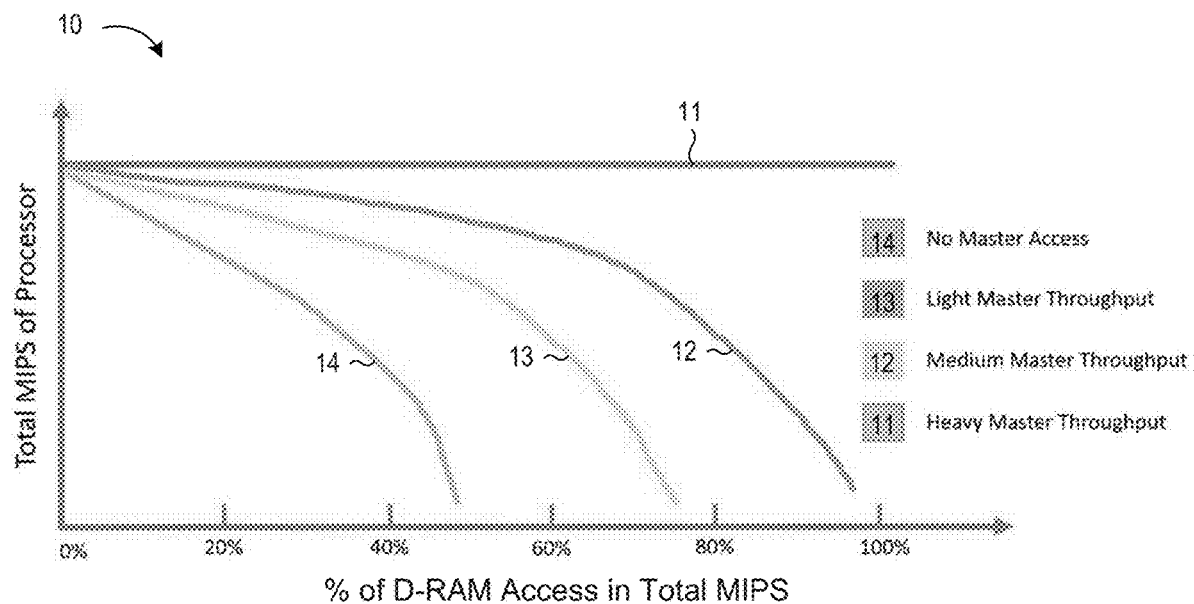
FIG. 10 depicts MIPS performance curves for processor performance in combination with different levels of master accesses to a shared single-port memory in accordance with selected embodiments of the present disclosure.

By using the foregoing algorithms to calculate test parameters for different coverage and resolution requirements and then compute performance measurement results, performance curves can be generated for use in predicting performance for SoC devices where a processor and master (e.g., DMA engine) can simultaneously access a single-port memory, depending on the access priority for the processor and master. For example, if a master device (e.g., DMA engine) has a higher priority than the processor for accessing the single-port memory, the effective MIPS of the processor is reduced when "% of D-RAM access in total MIPS" increases, as shown in FIG. 10 which depicts a MIPS performance graph 10 of curves 11-14 for a processor performance based on different levels of master accesses to a D-RAM as a shared single-port memory. In the depicted graph 10, the x-axis shows the percentage of D-RAM accesses in total MIPS. (As will be appreciated, a similar graph can be generated with the X-axis showing the percentage of I-RAM accesses in total MIPS.) In selected embodiments, it can be chosen to define as the percentage of D-RAM read (R) operations in total $$MIPS = \frac{c^R_{D,P}}{\alpha c^R_{I,P}} \times 100\%.$$

In other embodiments, it can be defined as the percentage of D-RAM write (W) operations in total MIPS $$MIPS = \frac{c^W_{D,P}}{\alpha c^R_{I,P}} \times 100\%.$$

In yet other embodiments, it can be defined as the percentage of D-RAM read/write operations in total $$MIPS = \frac{c_{D,P}^R + c_{D,P}^W}{\alpha c_{I,P}^R} \times 100\%.$$

In the depicted graph 10, the y-axis measures the total MIPS of the processor, where $$MIPS = \alpha \frac{c_{I,P}^R}{T} f_P.$$

With these defined axes, the first reference curve 11 is the MIPS performance curve for the processor when there is no access to the D-RAM by the master. The second reference curve 12 is the MIPS performance curve labelled "Light Master Throughput" for when the data transfer throughput is approximately 10-30% of its maximum throughput. The third reference curve 13 is the MIPS performance curve labelled "Medium Master Throughput" for when the data transfer throughput is approximately 30-70% of its maximum throughput. And the fourth reference curve 14 is the MIPS performance curve labelled "Heavy Master Throughput" for when the data transfer throughput is approximately 70-100% of its maximum throughput. As will be appreciated, additional performance curves can be plotted in the MIPS performance graph 10 so that there are enough curves to enable precise prediction of the processor MIPS performance in any master throughput by using linear interpolation between the curves.

Figure 11:
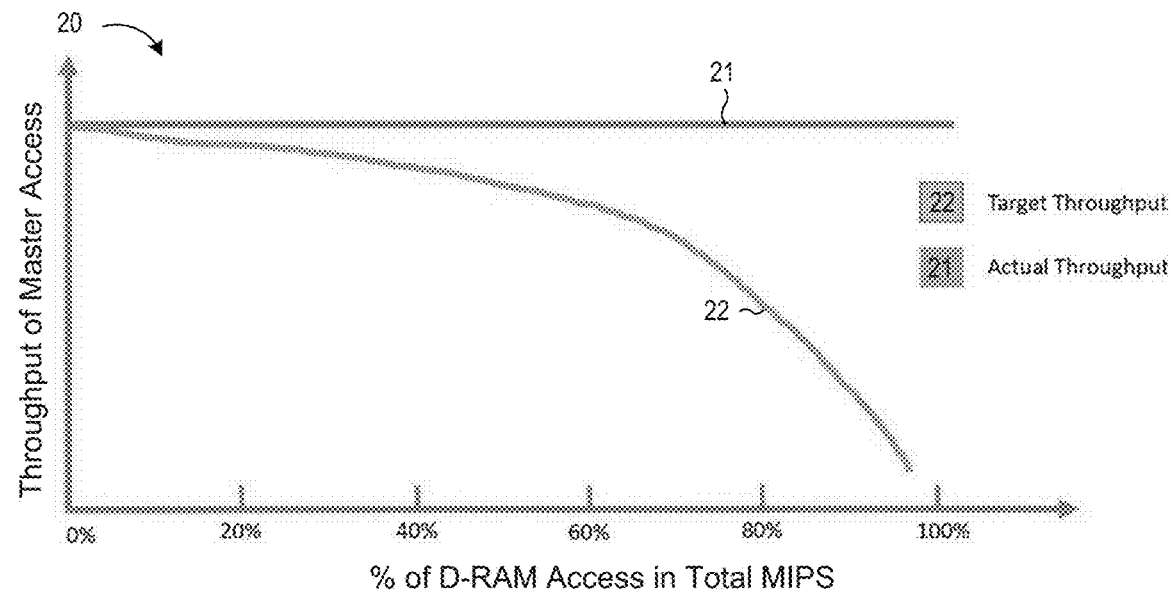
FIG. 11 depicts throughput performance curves for master when the master and a processor under test simultaneously access a single-port memory in accordance with selected embodiments of the present disclosure.

As another example, consider the situation where the processor has a higher priority than the master device (e.g., DMA engine) for accessing the single-port memory, in which case the effective throughput of master is reduced when "% of D-RAM access in total MIPS" of the processor increases, as shown in FIG. 11 which depicts throughput performance curves 20 for a master when the master and processor under test simultaneously access the D-RAM as a single-port memory. In the depicted graph 20, the x-axis shows the percentage of D-RAM accesses in total MIPS, similar to FIG. 10. In addition, the y-axis measures the throughput of the master's memory access operation, such as a read, write or read/write total throughput. With these defined axes, the first reference curve 21 is the "target throughput" curve when the master is the only master to access the D-RAM (e.g., when there is no access to the D-RAM by the processor), and is equivalent to the throughput of the master when 0% of memory access-related operations run in the processor. The second reference curve 22 is the "actual throughput" curve for the master's throughput when a certain % of the processor's MIPS is used to access the D-RAM.

By now it should be appreciated that there has been provided an apparatus, method, program code, and system for predicting performance of an integrated circuit device (e.g., an automotive system-on-chip (SoC) device) comprising a processor and one or more master devices having shared access to a single-port memory, such as an single-port D-RAM and/or I-RAM. In the disclosed embodiments, a timer in a performance monitoring hardware unit of the integrated circuit device is activated to measure a specified number of cycles of the processor in a defined measure instance. In selected embodiments, the timer is activated by enabling a first n-bit counter to count processor clock input pulses in response to an enable pulse signal and to stop counting processor input clock pulses in response to a disable pulse signal, thereby measuring the specified number of cycles of the processor in the defined measure instance. In addition, a memory access counter in the performance monitoring hardware unit of the integrated circuit device is activated to measure a first count of memory access requests to the single-port memory by the processor in the defined measure instance and to measure a second count of memory access requests to the single-port memory by the master device in the defined measure instance. In selected embodiments, the memory access counter is activated by enabling a second n-bit counter to count read acknowledgement pulses issued by a single-port I-RAM in response to memory read requests from the processor during the defined measure instance; enabling a third n-bit counter to count read acknowledgement pulses issued by the single-port I-RAM in response to memory read requests from the master device during the defined measure instance; and enabling a fourth n-bit counter to count write acknowledgement pulses issued by the single-port I-RAM in response to memory write requests from the master device during the defined measure instance. In addition, the activation of the memory access counter may also include enabling a fifth n-bit counter to count write acknowledgement pulses issued by the single-port I-RAM in response to memory write requests from the processor during the defined measure instance. In other embodiments, the memory access counter is activated by enabling a second n-bit counter to count read acknowledgement pulses issued by a single-port D-RAM in response to memory read requests from the processor during the defined measure instance; enabling a third n-bit counter to count write acknowledgement pulses issued by the single-port D-RAM in response to memory write requests from the processor during the defined measure instance; enabling a fourth n-bit counter to count read acknowledgement pulses issued by the single-port D-RAM in response to memory read requests from the master device during the defined measure instance; and enabling a fifth n-bit counter to count write acknowledgement pulses issued by the single-port D-RAM in response to memory write requests from the master device during the defined measure instance. Finally, the first count and second count are stored in memory.

In another form, there is provided a performance monitoring unit hardware circuit formed on an integrated circuit device comprising a processor and one or more master devices having shared access to a single-port memory (e.g., a single-port data RAM and/or single-port instruction RAM), the performance monitoring unit hardware circuit. In the disclosed embodiments, the PMU hardware circuit includes a timer to measure a specified number of cycles of the processor in a defined measure instance. In selected embodiments, the timer is activated by enabling a first n-bit counter to count processor clock input pulses in response to an enable pulse signal and to stop counting processor input clock pulses in response to a disable pulse signal, thereby measuring the specified number of cycles of the processor in the defined measure instance. In addition, the PMU hardware circuit includes a memory access counter to measure a first count of memory access requests to the single-port memory by the processor in the defined measure instance and to measure a second count of memory access requests to the single-port memory by the master device in the defined measure instance. In selected embodiments, the memory access counter is activated by enabling a second n-bit counter to count read acknowledgement pulses issued by a single-port instruction RAM (I-RAM) in response to memory read requests from the processor during the defined measure instance; enabling a third n-bit counter to count read acknowledgement pulses issued by the single-port I-RAM in response to memory read requests from the master device during the defined measure instance; and enabling a fourth n-bit counter to count write acknowledgement pulses issued by the single-port I-RAM in response to memory write requests from the master device during the defined measure instance. In such embodiments, the memory access counter is activated by enabling a fifth n-bit counter to count write acknowledgement pulses issued by the single-port I-RAM in response to memory write requests from the processor during the defined measure instance. In selected embodiments, the memory access counter is activated by enabling a second n-bit counter to count read acknowledgement pulses issued by a single-port data RAM (D-RAM) in response to memory read requests from the processor during the defined measure instance; enabling a third n-bit counter to count write acknowledgement pulses issued by the single-port D-RAM in response to memory write requests from the processor during the defined measure instance; enabling a fourth n-bit counter to count read acknowledgement pulses issued by the single-port D-RAM in response to memory read requests from the master device during the defined measure instance; and enabling a fifth n-bit counter to count write acknowledgement pulses issued by the single-port D-RAM in response to memory write requests from the master device during the defined measure instance. The PMU hardware circuit also includes a memory to store the first count and second count.

In yet another form, there is provided a computer program product having at least one recordable medium having stored thereon executable instructions and data which, when executed by at least one processing device, cause the at least one processing device to control a performance monitoring unit hardware circuit for predicting performance of an integrated circuit device comprising a processor and a master device having shared access to a single-port memory which may comprise a single-port data RAM (D-RAM) and/or a single-port instruction RAM (I-RAM). As disclosed, the computer program product instructions and data are executed to perform a sequence of operations, including calculating configuration parameters for the processor and master device. Subsequently, the master device is configured by specify data transfer configurations for throughput of the master device to access the single-port memory. Subsequently, the master device is enabled to begin make memory access requests to the single-port memory during a defined measure instance specified by a timer. Subsequently, the performance monitoring unit hardware circuit is enabled to measure a first count of memory access requests to the single-port memory by the processor in the defined measure instance and to measure a second count of memory access requests to the single-port memory by the master device in the defined measure instance by running "for-loop" operations for one or more combinations of memory access and nop( ) values, where a memory access value indicates a processor instruction which performs a memory access to the single-port memory, and a nop( ) value indicates a processor instruction which does not perform a memory access to the single-port memory. In selected embodiments, the processing device(s) executes computer readable program code to run "for-loop" operations by having the processor perform multiple memory read operations, multiple memory write operations, and multiple single-cycle non-memory-access operations. In other selected embodiments, the processing device(s) executes computer readable program code to run "for-loop" operations by performing N macro-loops, each comprising L micro-loops, where each micro-loop includes a first memory operation to read the single-port memory, a second nop( ) operation which does not access the single-port memory, and a third memory operation to write to the single-port memory. Subsequently, the performance monitoring unit hardware circuit is disabled upon conclusion of the defined measure instance. Finally, the first count of memory access requests and second count of memory access requests are stored in memory.

Although the described exemplary embodiments disclosed herein are directed to methods and systems for predicting performance of an integrated circuit device in which a single-port memory is accessed by a processor and one or more master devices, the present invention is not necessarily limited to the example embodiments illustrate herein, and various embodiments of the circuitry and methods disclosed herein may be implemented with other devices and circuit components. For example, various embodiments may be implemented in whole or in part with hardware and/or software to provide a Performance Management Unit (PMU) with control code for configuring, controlling, and reading back values from the PMU hardware for calculating performance measurement results. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for predicting performance of an integrated circuit device comprising a processor and one or more master devices having shared access to a single-port memory, the method comprising:
   activating a timer in a performance monitoring hardware unit of the integrated circuit device to measure a specified number of cycles of the processor in a defined measure instance;
   activating a memory access counter in the performance monitoring hardware unit of the integrated circuit device to measure a first count of memory access requests to the single-port memory by the processor in the defined measure instance and to measure a second count of memory access requests to the single-port memory by the master device in the defined measure instance;
   storing the first count and second count in memory, where activating the timer comprises enabling a first n-bit counter to count processor clock input pulses in response to an enable pulse signal and to stop counting processor input clock pulses in response to a disable pulse signal, thereby measuring the specified number of cycles of the processor in the defined measure instance;
   enabling a second n-bit counter to count read acknowledgement pulses issued by a single-port instruction RAM (I-RAM) in response to memory read requests from the processor during the defined measure instance; and
   enabling a third n-bit counter to count read acknowledgement pulses issued by the single-port I-RAM in response to memory read requests from the master device during the defined measure instance.

2. The method of claim 1, where the single-port memory comprises a single-port data RAM (D-RAM).

3. The method of claim 1, where the single-port memory comprises a single-port instruction RAM (I-RAM).

4. The method of claim 1, where the single-port memory comprises a single-port data RAM (D-RAM) and a single-port instruction RAM (I-RAM).

5. The method of claim 1, where activating the memory access counter comprises:
   and
   enabling a fourth n-bit counter to count write acknowledgement pulses issued by the single-port I-RAM in response to memory write requests from the master device during the defined measure instance.

6. The method of claim 5, where activating the memory access counter further comprises:
   enabling a fifth n-bit counter to count write acknowledgement pulses issued by the single-port I-RAM in response to memory write requests from the processor during the defined measure instance.

7. The method of claim 1, where activating the memory access counter comprises:
   enabling a fourth n bit counter to count read acknowledgement pulses issued by a single-port data RAM (D-RAM) in response to memory read requests from the processor during the defined measure instance;
   enabling a fifth n-bit counter to count write acknowledgement pulses issued by the single-port D-RAM in response to memory write requests from the processor during the defined measure instance;
   enabling a sixth n-bit counter to count read acknowledgement pulses issued by the single-port D-RAM in response to memory read requests from the master device during the defined measure instance; and
   enabling a seventh n-bit counter to count write acknowledgement pulses issued by the single-port D-RAM in response to memory write requests from the master device during the defined measure instance.

8. A performance monitoring unit hardware circuit formed on an integrated circuit device comprising a processor and one or more master devices having shared access to a single-port memory, the performance monitoring unit hardware circuit comprising:
   a timer to measure a specified number of cycles of the processor in a defined measure instance;
   a memory access counter to measure a first count of memory access requests to the single-port memory by the processor in the defined measure instance and to measure a second count of memory access requests to the single-port memory by the master device in the defined measure instance; and
   a memory to store the first count and second count, where the timer is activated by enabling a first n-bit counter to count processor clock input pulses in response to an enable pulse signal and to stop counting processor input clock pulses in response to a disable pulse signal, thereby measuring the specified number of cycles of the processor in the defined measure instance;
   enabling a second n-bit counter to count read acknowledgement pulses issued by a single-port instruction RAM (I-RAM) in response to memory read requests from the processor during the defined measure instance;
   enabling a third n-bit counter to count read acknowledgement pulses issued by the single-port I-RAM in response to memory read requests from the master device during the defined measure instance.

9. The performance monitoring unit hardware circuit of claim 8, where the single-port memory comprises a single-port data RAM (D-RAM).

10. The performance monitoring unit hardware circuit of claim 8, where the single-port memory comprises a single-port instruction RAM (I-RAM).

11. The performance monitoring unit hardware circuit of claim 8, where the single-port memory comprises a single-port data RAM (D-RAM) and a single-port instruction RAM (I-RAM).

12. The performance monitoring unit hardware circuit of claim 8, where the memory access counter is activated by:
   enabling a fourth n-bit counter to count write acknowledgement pulses issued by the single-port I-RAM in response to memory write requests from the master device during the defined measure instance.

13. The performance monitoring unit hardware circuit of claim 12, where the memory access counter is activated by enabling a fifth n-bit counter to count write acknowledgement pulses issued by the single-port I-RAM in response to memory write requests from the processor during the defined measure instance.

14. The performance monitoring unit hardware circuit of claim 8, where the memory access counter is activated by:
   enabling a fourth n bit counter to count read acknowledgement pulses issued by a single-port data RAM (D-RAM) in response to memory read requests from the processor during the defined measure instance;

enabling a fifth n-bit counter to count write acknowledgement pulses issued by the single-port D-RAM in response to memory write requests from the processor during the defined measure instance;

enabling a sixth n-bit counter to count read acknowledgement pulses issued by the single-port D-RAM in response to memory read requests from the master device during the defined measure instance; and enabling a seventh n-bit counter to count write acknowledgement pulses issued by the single-port D-RAM in response to memory write requests from the master device during the defined measure instance.

15. A non-transitory machine-readable storage medium having stored thereon executable instructions and data which, when executed by at least one processing device, cause the at least one processing device to control a performance monitoring unit hardware circuit for predicting performance of an integrated circuit device comprising a processor and a master device having shared access to a single-port memory by:

calculating configuration parameters for the processor and master device;

configuring the master device by specify data transfer configurations for throughput of the master device to access the single-port memory;

enabling the master device to begin make memory access requests to the single-port memory during a defined measure instance specified by a timer;

enabling the performance monitoring unit hardware circuit to measure a first count of memory access requests to the single-port memory by the processor in the defined measure instance and to measure a second count of memory access requests to the single-port memory by the master device in the defined measure instance by running "for-loop" operations for one or more combinations of memory access and nop( )values, where a memory access value indicates a processor instruction which performs a memory access to the single-port memory, and a nop( )value indicates a processor instruction which does not perform a memory access to the single-port memory;

disabling the performance monitoring unit hardware circuit upon conclusion of the defined measure instance; and storing the first count of memory access requests and second count of memory access requests.

16. The storage medium of claim 15, wherein the computer readable program, when executed on the system, causes the at least one processing device to run "for-loop" operations by having the processor perform multiple memory read operations, multiple memory write operations, and multiple single-cycle non-memory-access operations.

17. The storage medium of claim 15, wherein the computer readable program, when executed on the system, causes the at least one processing device to run "for-loop" operations by performing N macro-loops, each comprising L micro-loops, each micro-loop comprising a first memory operation to read the single-port memory, a second nop( )operation which does not access the single-port memory, and a third memory operation to write to the single-port memory.

18. The storage medium of claim 15, where the single-port memory comprises a single-port data RAM (D-RAM) and/or a single-port instruction RAM (I-RAM).

* * * * *